(12) United States Patent
Artusio et al.

(10) Patent No.: US 11,403,144 B2
(45) Date of Patent: Aug. 2, 2022

(54) METHOD AND SYSTEM OF INFORMATION AND COMMUNICATION TECHNOLOGY SERVICES PROVISIONING USING A DISTRIBUTED OPERATING SYSTEM

(71) Applicant: TELECOM ITALIA S.p.A., Milan (IT)

(72) Inventors: Luigi Artusio, Turin (IT); Antonio Manzalini, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 89 days.

(21) Appl. No.: 15/740,643

(22) PCT Filed: Jul. 9, 2015

(86) PCT No.: PCT/EP2015/065744
§ 371 (c)(1),
(2) Date: Dec. 28, 2017

(87) PCT Pub. No.: WO2017/005329
PCT Pub. Date: Jan. 12, 2017

(65) Prior Publication Data
US 2018/0196702 A1    Jul. 12, 2018

(51) Int. Cl.
*G06F 9/50* (2006.01)
*H04L 41/0806* (2022.01)
(Continued)

(52) U.S. Cl.
CPC .......... *G06F 9/5055* (2013.01); *G06F 9/5027* (2013.01); *G06F 9/5044* (2013.01);
(Continued)

(58) Field of Classification Search
None
See application file for complete search history.

(56) References Cited

U.S. PATENT DOCUMENTS 6,587,865 B1 * 7/2003 Kimbrel ............... G06F 9/4881
711/141
6,732,167 B1 * 5/2004 Swartz .................... H04L 29/06
709/220
(Continued)

FOREIGN PATENT DOCUMENTS

EP      2 669 799 A1    12/2013
EP      2669799 A1 *   12/2013  ........... G06F 9/5077

OTHER PUBLICATIONS

A. L. Freitas, N. Parlavantzas and J. Pazat, "Cost Reduction through SLA-driven Self-Management," 2011 IEEE Ninth European Conference on Web Services, 2011, pp. 117-124, doi: 10.1109/ECOWS.2011.23. (Year: 2011).*
(Continued)

*Primary Examiner* — Abu Zar Ghaffari
(74) *Attorney, Agent, or Firm* — Oblon, McClelland, Maier & Neustadt, L.L.P.

(57) ABSTRACT

A method of providing a service to a requesting Infrastructure Element belonging to plurality of Infrastructure Elements interconnected as a data network is proposed. The method includes operating a computing system for receiving a service request requesting a service from the requesting Infrastructure Element. The service request includes an indication of one or more performance requirements. The method also includes converting the service request to a service graph, which includes at least one task to be accomplished by complying with the performance requirements to provide the service. At least one Infrastructure Element currently capable of accomplishing the task complying with the performance requirements is selected, and the selected Infrastructure Element for accomplishing the task is configured. The method further includes causing the selected
(Continued)

Infrastructure Element to accomplish the task to provide the service to the requesting Infrastructure Element.

12 Claims, 7 Drawing Sheets

(51) Int. Cl.
  *H04L 41/5054* (2022.01)
  *G06Q 10/06* (2012.01)
  *H04L 41/5003* (2022.01)
(52) U.S. Cl.
  CPC ... *G06Q 10/0631* (2013.01); *G06Q 10/06315* (2013.01); *H04L 41/0806* (2013.01); *H04L 41/5054* (2013.01); *G06F 9/5072* (2013.01); *H04L 41/5003* (2013.01)

(56) References Cited

U.S. PATENT DOCUMENTS

| | | | | |
|---|---|---|---|---|
| 7,051,098 B2* | 5/2006 | Masters | G06F 9/06 | 709/224 |
| 7,181,743 B2* | 2/2007 | Werme | G06F 9/06 | 718/104 |
| 7,640,547 B2* | 12/2009 | Neiman | G06F 9/5044 | 705/5 |
| 7,668,899 B2* | 2/2010 | Stewart | G06F 9/5033 | 709/201 |
| 7,743,147 B2* | 6/2010 | Suorsa | G06F 8/61 | 709/217 |
| 7,747,457 B2* | 6/2010 | Cullen, III | G06Q 10/06311 | 705/7.13 |
| 7,797,333 B1* | 9/2010 | Chapman | G06F 16/2471 | 707/770 |
| 7,870,568 B2* | 1/2011 | Bernardin | G06Q 10/06 | 709/202 |
| 7,996,839 B2* | 8/2011 | Farkas | G06F 9/5044 | 718/102 |
| 8,099,084 B2* | 1/2012 | Singh | G06Q 10/10 | 455/414.1 |
| 8,140,371 B2* | 3/2012 | Franz | G06Q 10/0631 | 705/7.23 |
| 8,533,661 B2* | 9/2013 | Nucci | G06F 8/10 | 717/105 |
| 8,572,236 B2* | 10/2013 | Sherb | G06Q 10/06 | 709/224 |
| 8,578,076 B2* | 11/2013 | van der Linden | G06F 9/5077 | 710/72 |
| 8,677,353 B2* | 3/2014 | Machida | G06F 9/5077 | 714/4.11 |
| 8,719,832 B2* | 5/2014 | Briscoe | H04L 41/5022 | 718/104 |
| 9,274,811 B1* | 3/2016 | Reeves | G06F 8/61 | |
| 9,390,390 B1* | 7/2016 | Wertheimer | G06Q 30/0611 | |
| 9,430,280 B1* | 8/2016 | Shih | G06F 9/5005 | |
| 9,531,607 B1* | 12/2016 | Pai | H04L 43/06 | |
| 9,647,892 B2* | 5/2017 | Horman | H04L 41/0893 | |
| 9,723,070 B2* | 8/2017 | Brelsford | G06F 9/5072 | |
| 9,792,647 B1* | 10/2017 | Lark | G06Q 30/0601 | |
| 10,069,693 B1* | 9/2018 | Daptardar | H04L 41/5029 | |
| 10,096,060 B2* | 10/2018 | Rabenold | G06Q 30/08 | |
| 2002/0039352 A1* | 4/2002 | El-Fekih | H04L 43/0894 | 370/252 |
| 2003/0069949 A1* | 4/2003 | Chan | H04L 41/5054 | 709/221 |
| 2004/0064548 A1* | 4/2004 | Adams | G06F 9/5072 | 709/224 |
| 2004/0068729 A1* | 4/2004 | Simon | G06Q 10/06 | 718/102 |
| 2005/0198244 A1* | 9/2005 | Eilam | G06F 9/5061 | 709/223 |
| 2006/0155633 A1* | 7/2006 | Fellenstein | G06Q 10/06 | 705/37 |
| 2006/0229896 A1* | 10/2006 | Rosen | G06Q 10/10 | 705/321 |
| 2007/0299763 A1* | 12/2007 | Yoshida | G06Q 10/06 | 705/37 |
| 2008/0049022 A1* | 2/2008 | Sherb | G06F 9/5038 | 345/440 |
| 2008/0052219 A1* | 2/2008 | Sandholm | G06Q 30/08 | 705/37 |
| 2008/0162637 A1* | 7/2008 | Adamczyk | H04L 67/24 | 709/204 |
| 2009/0144420 A1* | 6/2009 | Attanasio | H04L 41/046 | 709/224 |
| 2010/0223217 A1* | 9/2010 | Little | G06Q 10/06 | 709/224 |
| 2011/0138047 A1* | 6/2011 | Brown | G06Q 10/10 | 709/226 |
| 2011/0231899 A1* | 9/2011 | Pulier | G06F 9/45558 | 726/1 |
| 2011/0238458 A1* | 9/2011 | Purcell | G06F 9/5072 | 705/7.27 |
| 2011/0258246 A1* | 10/2011 | Khandekar | G06F 9/5027 | 709/201 |
| 2012/0159506 A1* | 6/2012 | Barham | G06F 9/5066 | 718/104 |
| 2012/0284410 A1* | 11/2012 | Dudek | G06F 9/5027 | 709/226 |
| 2013/0227091 A1* | 8/2013 | Tompkins | G06F 9/5072 | 709/220 |
| 2013/0304903 A1* | 11/2013 | Mick | H04L 67/16 | 709/224 |
| 2014/0006626 A1* | 1/2014 | Breiter | G06F 9/50 | 709/226 |
| 2014/0032257 A1* | 1/2014 | Houle | G06Q 10/06315 | 705/7.25 |
| 2014/0040343 A1* | 2/2014 | Nickolov | H04L 69/32 | 709/201 |
| 2014/0082131 A1* | 3/2014 | Jagtap | G06F 9/5072 | 709/217 |
| 2014/0237114 A1* | 8/2014 | Lin | H04L 41/042 | 709/224 |
| 2014/0282536 A1* | 9/2014 | Dave | G06Q 30/0631 | 718/1 |
| 2014/0355430 A1* | 12/2014 | Smith | H04W 28/0263 | 370/230 |
| 2014/0379938 A1* | 12/2014 | Bosch | H04L 47/125 | 709/242 |
| 2015/0033217 A1* | 1/2015 | Mellor | G06F 16/211 | 717/171 |
| 2015/0067783 A1 | 3/2015 | Pulier et al. | | |
| 2015/0071292 A1* | 3/2015 | Tripathi | H04L 45/66 | 370/392 |
| 2015/0120943 A1* | 4/2015 | Slupik | H04L 63/029 | 709/227 |
| 2015/0124645 A1 | 5/2015 | Yadav et al. | | |
| 2015/0135185 A1* | 5/2015 | Sirota | G06F 9/5011 | 718/103 |
| 2015/0154233 A1* | 6/2015 | Lightner | G06F 11/3055 | 714/32 |
| 2015/0379427 A1* | 12/2015 | Dirac | G06N 20/00 | 706/12 |
| 2016/0100002 A1* | 4/2016 | Dimonte | H04L 51/24 | 709/203 |
| 2016/0239906 A1* | 8/2016 | Kruglick | G06Q 30/08 | |
| 2016/0277261 A9* | 9/2016 | Ansari | G06F 16/1847 | |
| 2018/0041600 A1* | 2/2018 | Aikoh | G06F 11/203 | |
| 2018/0196702 A1* | 7/2018 | Artusio | G06F 9/5055 | |

OTHER PUBLICATIONS

I. Petri, T. Beach, M. Zou, J. D. Montes, O. Rana and M. Parashar, "Exploring Models and Mechanisms for Exchanging Resources in a Federated Cloud," 2014 IEEE International Conference on Cloud Engineering, 2014, pp. 215-224, doi: 10.1109/IC2E.2014.9. (Year: 2014).*

S. Khoudali, K. Benzidane, A. Sekkaki and M. Bouchoum, "Toward (56) References Cited

OTHER PUBLICATIONS an elastic, scalable and distributed monitoring architecture for cloud infrastructures," 2014 International Conference on Next Generation Networks and Services (NGNS), 2014, pp. 132-138, doi: 10.1109/NGNS.2014.6990241.(Year: 2014).*

International Search Report dated Dec. 4, 2015, in PCT/EP2015/065744 filed Jul. 9, 2015.

Jingwen, Jin et al., "Source-Based Qos Service Routing in Distributed Service Networks", 2004 IEEE Communications Society, vol. 4, (2004), pp. 2036-2041, XP010709656.

Korean Office Action dated May 17, 2021 in Korean Application No. 10-2018-7003976 (with computer generated English translation).

Office Action dated Nov. 24, 2021 in Korean Application No. 10-2018-7003976 (with Computer Generated English Translation).

* cited by examiner

METHOD AND SYSTEM OF INFORMATION AND COMMUNICATION TECHNOLOGY SERVICES PROVISIONING USING A DISTRIBUTED OPERATING SYSTEM

BACKGROUND OF THE INVENTION

Field of the Invention

The present invention relates to telecommunications and Information Communication Technology, or ICT. Particularly, the present inventions regards the allocation and management of resources (either virtual or physical resources) available in a network (comprising computing and storage elements, mobile telecommunication/wired telecommunication elements and connectable devices) in order to provide an ICT service (e.g., from a virtual machine to the control of a self-driving car, or a robot movement) requested by software applications. Even more particularly, the present invention regards a method and a system of ICT services provisioning.

Overview of the Related Art

The increasing of the data transmission speeds in present wired and wireless (mobile) telecommunication networks and the increasing computational and storage capabilities of present networking hardware, and more generally ICT (Information and Communication Technology) hardware, are allowing a further evolution in networks of interconnected (at least partly) electronic devices.

For example, telecommunication networks are evolving towards a virtualized structure in which network functions are virtualized and dynamically allocated onto logical resources (e.g., virtual machines) hosted onto an underneath physical infrastructure.

The concept of telecommunication network virtualization as herein used defines an act of combining hardware and software network resources and network functionality into a single, software-based administrative entity or domain. In turn, multiple software-based administrative entities can be combined into larger interoperable domains.

Telecommunication network virtualization allows network operators and service providers to optimize the use of the resources of the network so as to reduce management costs, while at the same time providing improved and/or new services.

Telecommunication and ICT virtualization generally exploits Network Function Virtualization (NFV) and/or Software Defined Networks (SDN) and/or Cloud Computing.

NFV is a network architecture concept providing that network (node) functions, e.g. from switches/routers to middle-boxes (i.e., computer networking device that transforms, inspects, filters, or otherwise manipulates traffic for purposes other than packet forwarding such as for example firewalls and network address translators), which usually are implemented as proprietary equipment, are virtualized as software application entities that may be dynamically allocated and executed on virtual resources, such as for example Virtual Machines, of a cloud computing infrastructure.

'Cloud computing' herein defines a model for enabling de-centralized, convenient, on-demand network access to a shared pool of configurable computing resources (e.g., networks, servers, storage, software applications and other services) that can be rapidly provisioned and released with minimal management effort or interaction by service provider.

SDN is a network architecture that provides decoupling network control and communication functions in a telecommunication network. Typically, the SDN is based on the decoupling of a hardware data plane from a software control plane of the telecommunication network. Moreover, the software control plane is not necessarily directly implemented in the controlled hardware data plane, but potentially in a cloud computing infrastructure comprised/associated with the telecommunication network or in any standard distributed processing resources (for example built using instructions set architecture x86).

It should be noted that SDN and NFV are not dependent on each other, i.e. NFV may be deployed without a SDN being required and vice-versa. SDN, NFV and Cloud Computing are mutually beneficial.

Telecommunication networks may be able to provide any ICT services by "combining" dynamically logical resources belonging to the mobile and fixed communication networks, to cloud computing and to devices terminals e.g., User Equipments (UE), such as for example smartphones and tablets, and more generally any device capable to connect in a network with other devices, such as for example personal computers, autonomous cars, robots and drones.

In the art, systems have been proposed to provide a virtualization of telecommunications and ICT resources.

For example, OpenStack® is an open source cloud operating system that could be implemented as an orchestrator (i.e., a managing element) for NFV architectures. OpenStack® can control large pools of computing, storage, and networking resources throughout a Data Center (DC), all managed through a dashboard that gives administrators control while empowering their users to provision resources through a web interface. OpenStack® is built on a shared-nothing (i.e., a distributed computing architecture in which each node is independent and self-sufficient), messaging-based architecture with modular components, each of which manages a different service to be provided. The primary component of the open source cloud operating system is the Nova computing service that orchestrates the creation and deletion of Virtual Machines (VMs). For doing this, Nova works with open source libraries such as libvirt (i.e., a virtualization Application Programming Interface, or API, implementing a toolkit to interact with the virtualization capabilities of recent versions of Linux-based OS and other Operating Systems—OS). Similar to other OpenStack® components, Nova is based on a modular architectural design where services can be co-resident on a single host (e.g., a VM) or, more commonly, on multiple hosts.

CloudNFV™ is an open platform for implementing Network Functions Virtualization (NFV) based on Cloud Computing and Software Defined Networking (SDN) technologies in a multi-vendor environment.

OpenNFV is a network architecture that consists of two main parts. The former one is a shared library that is linked with a Virtual Network Function application on a data plane; the latter one is a control application running on a controller. The shared library provides an API having procedures for exporting and importing different types of state from a Virtual Network Function instance and to enable generation of various events. The control application runs on a SDN controller and is responsible for coordinating the transfer of both network and NFV state using OpenFlow protocol and OpenNFV protocol respectively.

SUMMARY OF THE INVENTION

The Applicant has observed that, generally, method and systems known in the art provide unsatisfactory results with respect to the provisioning of ICT services in an optimized way.

With reference to the OpenStack®, The Applicant has perceived that currently, the Nova uses algorithms (e.g., Filter&Weight) which schedule VMs in isolation, without considering characteristics and status of the underneath (physical) network links (e.g., link capacity and load conditions). Particularly, no traffic steering management across chains of VMs is provided, especially for terminals or middle-boxes (e.g., transparent firewall, or traffic monitoring entities) that do not have an architecture comprising a complete TCP/IP stack (i.e., terminals or middle-boxes do not execute routing/switching functions and as such are not reachable by TCP/IP traditional protocols).

Regarding the CloudNFV™, the Applicant has perceived that the adaptation of the cloud computing framework to telecommunication networks does not really address problems related to fast scalability and elasticity management and allocation of resources, which are needed for effectively accomplishing instructions contained in service graphs (which are logical representations of required software instructions or tasks describing how to execute a "service request"), particularly regarding temporary changes (e.g. increases) in the resources demand.

In the art a wide variety of expedient have been proposed for managing VM allocation and traffic routing in telecommunication networks, but the known art solutions addresses these two aspects separately.

In addition, the Applicant has found that in the art there is a general tendency to consider ICT resources (e.g., data centers), network infrastructures (e.g., network nodes) and device terminals (e.g., computers, smartphones, autonomous cars, robots and drones) as belonging to different separate clusters of entities able to exchange data among them— particularly thanks to the network infrastructures. The Applicant has instead diverged from such a point of view just described by considering the ICT resources, network infrastructures and terminals as a single network of interconnected resources.

Thanks to this assumption, the Applicant has perceived that a joint design of logical resources allocation and traffic steering across them could bring several advantages (e.g., costs reductions and improved performances) in networks of interconnected resources, where resources dynamic allocation and optimization are very critical.

Thus, The Applicant has coped with the problem of devising a system and method adapted to overcome, at least partially, the problems affecting the prior art solutions.

Particularly, even though not exclusively, the Applicant has tackled the problems of how dynamically allocating logical computing and memory resources (e.g., provided as VM) and how selecting proper data traffic paths to cross said logical resources (e.g., structuring 'chains' of logical resources), given a certain service request (e.g., issued from an ICT user) with specific quality requirements, in order to meet in an optimized manner the service requirements in terms of Quality of Service—QoS—and/or Quality of Experience—QoE (e.g., provisioning time, service reliability, end-to-end latency, telecommunication network latency, applications latency etc.).

The Applicant has found that it is possible to solve (or at least mitigate) this problems by means of a, preferably distributed service provisioning method and system adapted to select and manage network resources (comprising computing elements, mobile telecommunication/wired telecommunication elements and connectable devices), denoted as 'Global Operating System'—G-OS for short. The G-OS preferably comprises a distributed software architecture that is preferably distributed among each Infrastructure Element of the network, such for example from the terminals served by the network, to the network Infrastructure Elements and to cloud computing resources advantageously implemented for managing the operation of the network.

In general, the G-OS is configured for the end-to-end (i.e., between two end-points of an infrastructure, e.g., from a provider of the service to a subscriber of the service) fulfillment of service requests by taking care of the different steps involved in the provisioning of virtual functions and sub-services such as selecting and allocating physical resources, creating and removing logical resources in the virtual distributed infrastructure as well as installing, configuring, monitoring, running and stopping software applications in the logical resources.

Advantageously, the G-OS is arranged for collecting, filtering and processing (e.g., possibly implementing analytics tools configured for analyzing so-called 'Big Data') network and services operating data (e.g., execution time, traffic load and congestion status, performance parameters, alarms, logs, notifications, etc.). The information inferred from such data are then used by the G-OS for provisioning and managing of resources of the network in order to fulfill service requests.

Particularly, one aspect of the present invention proposes a method of providing a service to a requesting Infrastructure Element belonging to plurality of Infrastructure Elements interconnected to form a data network. The method comprises operating a computing system for receiving a service request requesting the provisioning of a service from the requesting Infrastructure Element, the service request comprising an indication of one or more performance requirements; converting said service in a service graph, the service graph comprising at least one task to be accomplished complying with said one or more performance requirements in order to provide said service; selecting at least one Infrastructure Element currently capable the accomplishment of said at least one task complying with said one or more performance requirements; configuring the selected at least one Infrastructure Element for accomplishing said at least task, and causing the selected at least one Infrastructure Element to accomplish said at least one task to provide the service to the requesting Infrastructure Element.

Preferred features of the present invention are set forth in the dependent claims.

In an embodiment of the invention, in said requesting Infrastructure Element at least one software application is instantiated. Moreover, the step a) of receiving a service request requesting the provisioning of a service from the requesting Infrastructure Element comprises receiving the service request from at least one instance of a software application instantiated on said requesting Infrastructure Element. In addition, the step e) of causing the selected at least one Infrastructure Element to accomplish said at least one task to provide the service to the requesting Infrastructure Element comprises causing the selected at least one Infrastructure Element to accomplish said at least one task to provide the service to said at least one instance of a software application instantiated on said requesting Infrastructure Element.

In an embodiment of the invention, said indication of one or more performance requirements comprises one or more minimum performance values. Moreover, the step of c) selecting at least one Infrastructure Element of the set of infrastructure elements currently capable the accomplishment of the at least one task complying with said one or more performance requirements comprises identifying a set of one or more of the Infrastructure Elements capable of providing said at least one task, and selecting at least one Infrastructure Element of the set of Infrastructure Elements currently capable of accomplishing the at least one task with a higher performance value with respect to said one or more minimum performance values.

In an embodiment of the invention, the Infrastructure Elements comprise at least one among smartphones, tablets, personal computers, autonomous cars, robots, 3D printing systems, automated factory machineries, drones, data centers, virtualization servers, cloud computing networks, IT servers for implementing thereof, radio base stations, middleboxes, switches, routers and generally network nodes comprising OSI layer 2-7 network functionalities.

In an embodiment of the invention, the service comprises at least one among Virtual Private Networks (VPN), Short Messaging Service (SMS), Virtual Machines (VM), Virtual Storage, Platform as a Service (PaaS), Infrastructure as a Service (IaaS), Software as a service (SaaS), manufacturing a 3D printed element, collection of measurements, computing power, data storage and robot actions.

In an embodiment of the invention, the method further comprising the step of f) selecting and configuring an Infrastructure Element belonging to the plurality of Infrastructure Elements for managing the execution of steps c)-e).

In an embodiment of the invention, the step of f) selecting and configuring an Infrastructure Element belonging to the plurality of Infrastructure Elements for managing the steps c)-e) comprises providing in the Infrastructure Element selected a master software module configured for managing the execution of steps c)-e).

In an embodiment of the invention, the computing system comprises a data base comprising a list of the plurality of Infrastructure Elements of the network providing an indication of which tasks each Infrastructure Element is capable to accomplish. Moreover, identifying a set of one or more of the Infrastructure Elements capable of providing said at least one task comprises having the master software module identifying the set of one or more of the Infrastructure Elements capable of providing said at least one task on the basis of said indication comprised in the data base.

In an embodiment of the invention, the method further comprises the step of g) providing a node software module in each Infrastructure Element belonging to the plurality of Infrastructure Elements configured for interacting with the master software module.

In an embodiment of the invention, the method further comprising the step of h) providing a shared software space shared among the master software module and the node software modules of the set of one or more of the Infrastructure Elements capable of providing said at least one task, said shared software space being arranged for storing and exchanging information among the master software module and the node software modules capable of providing said at least one task.

In an embodiment of the invention, selecting at least one Infrastructure Element of the set of Infrastructure Elements currently capable of accomplishing the at least one task with a higher performance value with respect to said one or more minimum performance values comprises having the master software module storing in the shared software space the one or more minimum performance values required for the accomplishment of the at least one task; having each one of the node software modules storing in the shared software space one or more currently ensured performance values for the accomplishment of the at least one task by the corresponding Infrastructure Elements, having the master software module analyzing the one or more currently ensured performance values for the accomplishment of the at least one task provided by the node software modules; having the master software module assigning the at least one task to the at least one Infrastructure Element of the set of Infrastructure Elements currently capable of accomplishing the at least one task with the highest performance value.

Another aspect of the present invention proposes a computing system for providing a service to a requesting Infrastructure Element belonging to plurality of Infrastructure Elements interconnected to form a data network. The computing system comprises: a service element arranged for receiving a service request requesting the provisioning of a service from the requesting Infrastructure Element, the service request comprising an indication of one or more performance requirements and converting said service in a service graph, the service graph comprising at least one task to be accomplished complying with said one or more performance requirements in order to provide said service, and a software module arranged for selecting at least one Infrastructure Element currently capable the accomplishment of said at least one task complying with said one or more performance requirements; configuring the selected at least one Infrastructure Element for accomplishing said at least task, and causing the selected at least one Infrastructure Element to accomplish said at least one task to provide the service to the requesting Infrastructure Element.

BRIEF DESCRIPTION OF THE DRAWINGS

These and others features and advantages of the solution according to the present invention will be better understood by reading the following detailed description of an embodiment thereof, provided merely by way of non-limitative exampled, to be read in conjunction with the attached drawings, wherein.

DETAILED DESCRIPTION OF THE INVENTION

Figure 1A:
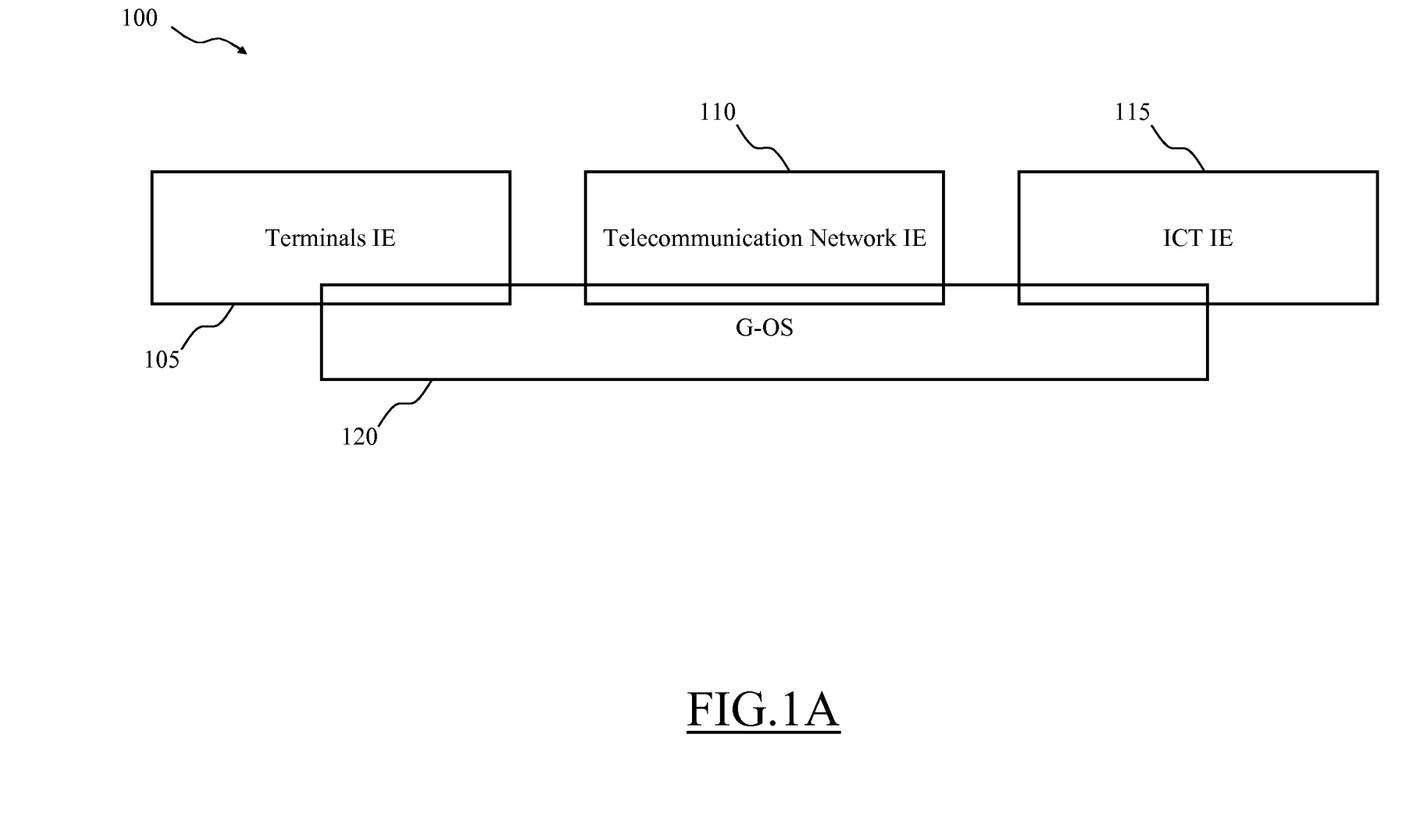
FIG. 1A is a schematic diagram of a network according to an embodiment of the present invention.

With reference to the drawings, FIG. 1A is a schematic diagram of a network 100 according to an embodiment of the present invention.

Generally, the network 100 according to an embodiment of the present invention comprises three main categories of entities or Infrastructure Elements: (device) terminal Infrastructure Elements 105, telecommunication Infrastructure Elements 110 and Information Communication Technologies (ICT) Infrastructure elements 115.

For example, the terminal Infrastructure Elements 105 comprise, but they are not limited to, User Equipments (UE), such as for example smartphones and tablets, and generally any device possibly connectable in network with other entities, such as for example personal computers, autonomous cars, robots 3D printing systems, automated factory machineries, drones etc.

The telecommunication Infrastructure Elements 110 comprise, but they are not limited to, entities belonging to mobile telecommunication networks and belonging to wired telecommunication networks, such as radio base stations, middleboxes, switches, routers and generally network nodes comprising OSI layer 2-7 network functionalities.

The ICT Infrastructure Elements 115 comprise, but they are not limited to, data centers, virtualization servers, cloud computing networks, IT servers for implementing thereof, etc.

According to an embodiment of the present invention, the network 100 further comprises a Global Operating System, or G-OS 120, i.e. a preferably distributed computing system arranged for providing and seamlessly managing resources of all the network regardless whether they are terminal Infrastructure Elements 105, telecommunication Infrastructure Elements 110 and/or ICT Infrastructure Elements 115 in order to provide (ICT) services throughout the network 100 (e.g., a service requested by an application program, running on a terminal Infrastructure Element 105, the implementation of the service requiring coordinated operation of one or more entities of the network 100) in a fast, reliable and efficient way, as described in the following.

It should be noted that the term service or ICT service is herein generally used for denoting service or functionalities related to telecommunications such as for example Virtual Private Networks (VPN), Short Messaging Service (SMS), etc., services or functionalities related to ICT infrastructure such as for example Virtual Machines (VM), Virtual Storage, Platform as a Service (PaaS), Infrastructure as a Service (IaaS), Software as a service (SaaS), etc., and service or functionalities that may be provided by a connected terminal such as for example manufacturing a 3D printed element (by a 3D printer), a collection of measurements (e.g. acquired by an IoT network of sensing elements deployed in a predetermined geographic area), computing power (e.g., provided by any element connected to the network 100), data storage, remote control of a manufacturing line in a factory (by remotely controlled automated factory machineries) a robot action, etc.

Figure 1B:
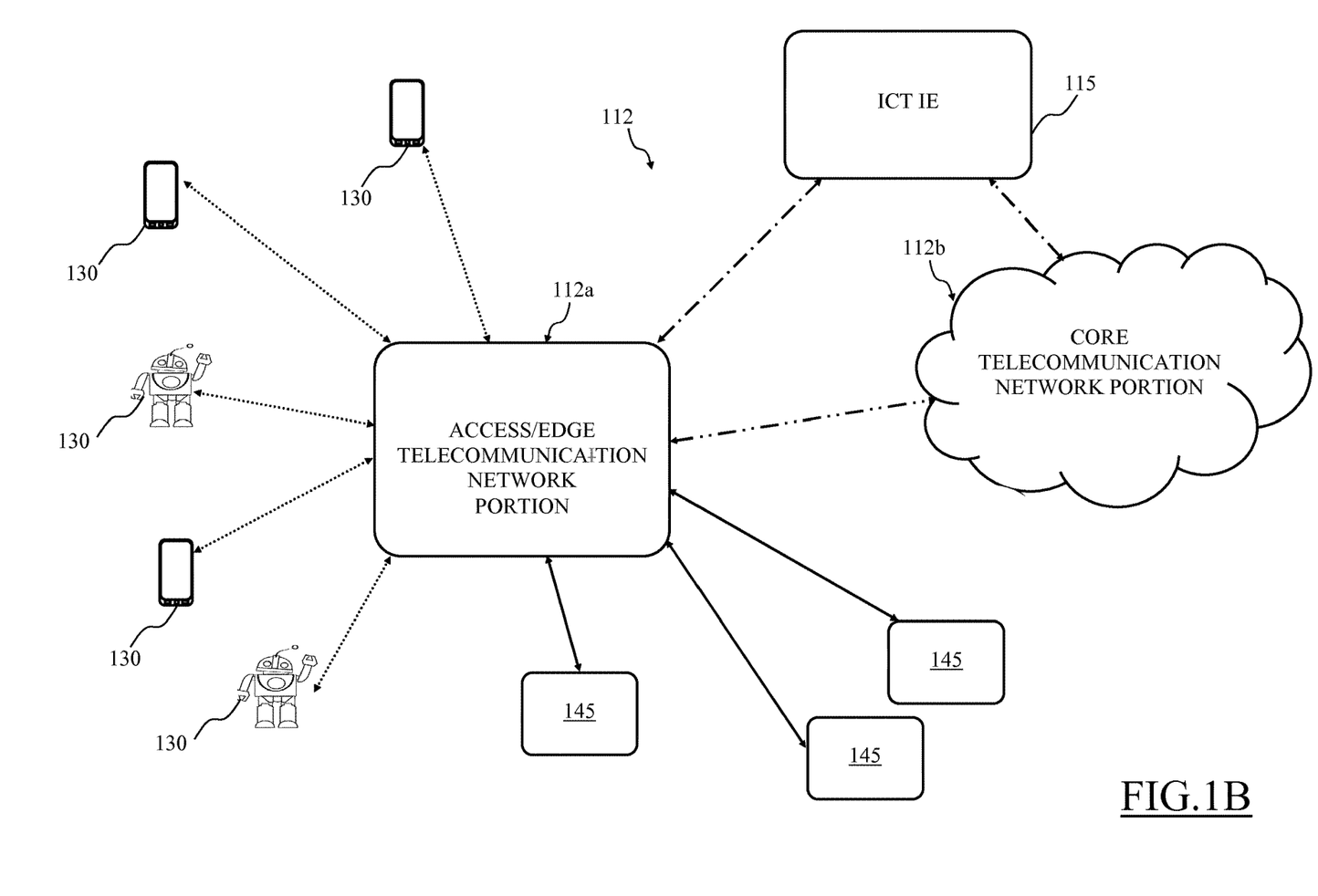
FIG. 1B is a more detailed diagram of the network of FIG. 1A.

FIG. 1B is a more detailed schematic diagram of the network 100.

The telecommunication Infrastructure Elements 110 provide a telecommunication network 112, which preferably comprises an access/edge telecommunication network portion 112a and a core telecommunication network portion 112b.

For example, the access/edge telecommunication network portion 110a comprises a plurality of (wired and/or wireless) access/edge network elements (not detailed in FIG. 1B), such as radio base stations, e.g. evolved Node B, or eNB in Long Term Evolution (LTE)/Long Term Evolution-Advanced (LTE-A) mobile networks technology, other wireless interconnection devices (e.g., Wi-Fi™ modems, Bluetooth®, etc.) and/or wired interconnection devices (e.g., wired modems, edge routers, etc.), which are arranged for establishing data connections with terminal Infrastructure Elements 105.

Access/edge network elements of the access/edge telecommunication network portion 112a are configured for managing communication of (i.e., serving) (mobile) User Equipment, or UE 130 (such as for example smartphones and tablets, and generally any device capable to connect with the telecommunication network 112, such as for example personal computers, autonomous cars, robots and drones), comprised within respective one or more covered areas, or cells (not shown), and/or wired device terminals 145 (e.g., personal computers, automated factory machineries, 3D printing systems, etc.).

The access/edge telecommunication network portion 112a is generally connected to the core telecommunication network portion 112b, which preferably comprises an infrastructure (e.g., backbones, hierarchically connected routing nodes etc.) that provides a (preferably high data rate) path for the exchange of information between different terminals, telecommunication networks and/or ICT Infrastructure Elements preferably worldwide. For example, the core telecommunication network portion 112b interconnects terminals, telecommunication networks and/or ICT Infrastructure Elements belonging to different Packet Data Networks PDN (e.g., the Internet, Local Area Networks—LAN—, Wide Area Networks—WAN—etc.) not detailed in FIG. 1B.

In an embodiment of the invention (not shown in the Figures), the core telecommunication network portion 112b may comprise wired or wireless connections to other terminals 145 of the network 100 such as for example personal computers, autonomous cars, robots, 3D printers, automated industrial facilities and drones.

In addition, both the access/edge telecommunication network portion 112a and the core telecommunication network portion 112b may be connected or connectable to ICT Infrastructure Elements 115 such as for example IT servers for implementing data centers, virtualization servers, cloud computing networks, etc.

Figure 2:
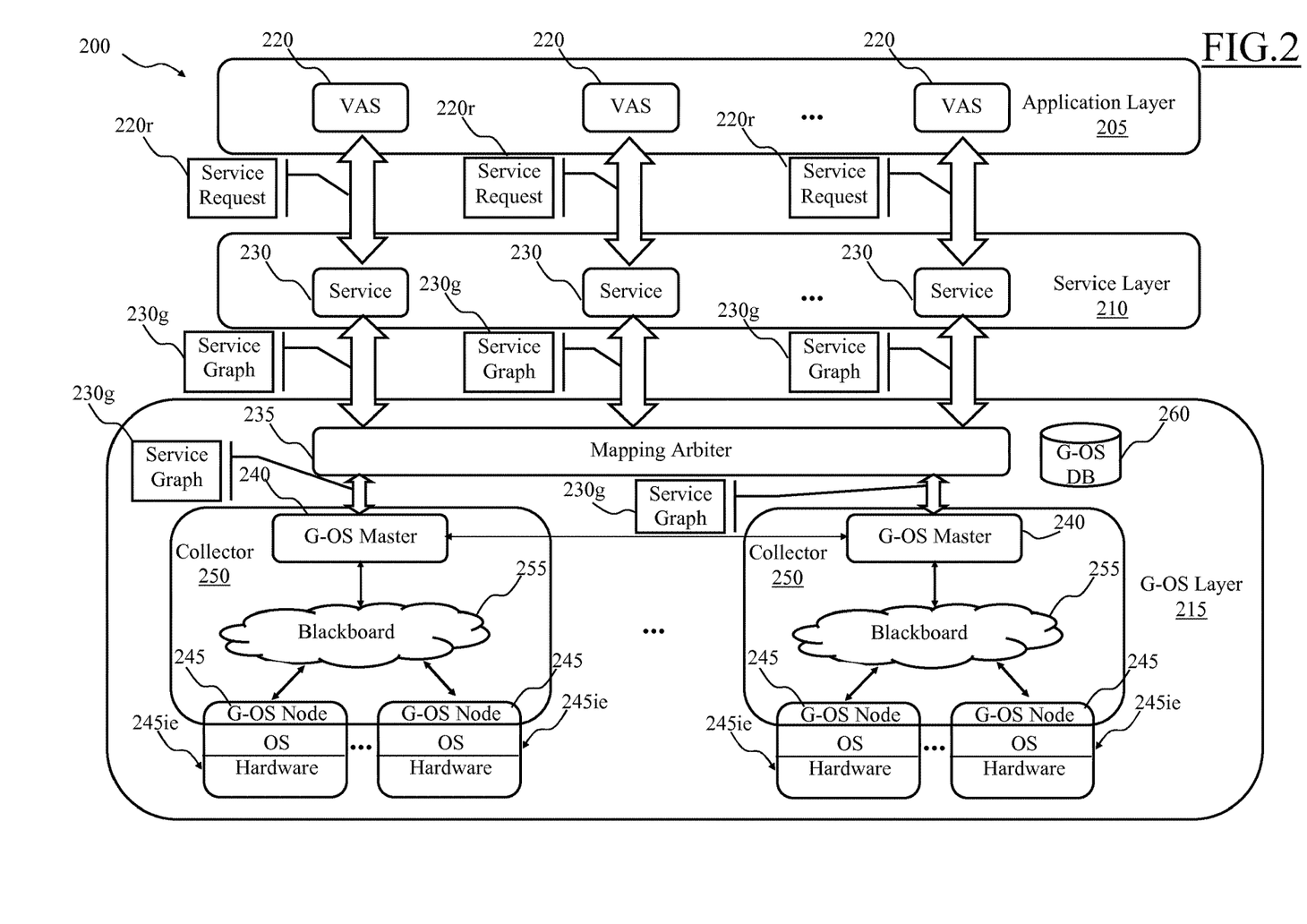
FIG. 2 is a schematic diagram of a layered structure of the network according to an embodiment of the present invention.

FIG. 2 is a schematic diagram of a layered structure 200 of the network 100 according to an embodiment of the present invention.

The architectural model 200 comprises three main layers: an Application Layer—AL 205, a Service Layer—SL 210 and a Global Operating System, or G-OS, Layer—G-OSL 215.

The Application Layer 205 is the layer where third-party software applications, or value-added services—VAS 220, are executed. Each VAS 220, or related procedure and process being executed in the Application Layer 205, is able to send to the Service Layer 210 corresponding one or more service requests 220r which generally implies the execution of one or more software tasks, simply tasks in the following (wherein a software task is a software component executing a certain service logic, i.e. piece of software code implementing certain rules or operations). In other words, a service 230 can be seen as a software program, comprising a set of software components for achieving a specific desired goal (defined by the VAS 220 who issues the corresponding service request 220r).

In an embodiment of the invention, VAS 220 specify performance requirements to be achieved by the network 100 in accomplishing the service requests 220r. Preferably, VAS 220 indicate such performance requirements to be achieved by means of a set of one or more Key Performance Indicators—KPI—, each one regarding one or more specific performance requirements referred to operations to be performed by infrastructure elements of the network 100 for providing the requested service. Preferably, the KPI comprise an indication of specific Quality of Service—QoS—requirements. Even more preferably the KPI express a minimum performance value required for providing the service 230 in an effective manner.

The Service Layer 210 is a layer responsible for the collection and the interpretation of a service request 220*r* (e.g., by means of one or more service elements) coming from the Application Layer 205, via a so-called "SL Northbound Interface". The Service Layer 210 supports the software capabilities for the translation of the received service request 220*r* (for the provisioning of the corresponding service 230) into a corresponding service graph 230*g* that is a representation of the requested service 220*r*, for example, made of service components, translated as tasks in the corresponding service graph 230*g*, and links among them.

The Service Layer also comprises a software interface, i.e. a SL Southbound Interface configured for communicating with the G-OS Layer 215.

In other words the Service Layer 210 could be seen as a bridge layer between the high level Application Layer 205 and the low level G-OS Layer 215.

In operation, each service request 220*r* generated by a corresponding VAS 220 in the Application Layer 205 is analysed and translated in a respective service graph 230*g*, which is a logical decomposition of the service request 220*r* in a sequence of tasks (i.e., a set of instructions formatted in such a way to be processed by the lower layer—the G-OS Layer 215) to be performed, possibly comprising related KPI (e.g., QoS, latency, geographic position, etc.) requirements.

The tasks comprised in the service graph 230*g*, for being executed, have to be allocated in resources of the network 100 selected among terminal Infrastructure Elements 105, telecommunication Infrastructure Elements 110 and/or ICT infrastructure elements 115, the one or more infrastructure elements being selected according to addressing the specific tasks indicated in the service graph 230*g* so as to be accomplished in an optimized manner.

In an embodiment of the present invention, the resources of the network 100 are managed by the lowest layer, i.e. the G-OS Layer 215.

Preferably, the G-OS Layer 215 is a distributed software architecture, comprising three sub-layers namely: a Mapping Arbiter sub layer, a G-OS Master sub-layer and a G-OS Node sub-layer.

The Mapping Arbiter sub layer comprises a Mapping Arbiter—MA—235, the G-OS Master sub-layer comprises one or more software modules denoted as G-OS Masters 240, and the G-OS node sub-layer comprises one or more software modules denoted as G-OS Nodes 245.

Each G-OS Node 245 is a software module executed on top of a specific Operating System—OS—(e.g., Linux-based OS, Android, Robot Operating System, etc.) of an Infrastructure Element—IE—245*ie* of the network 100.

The term Infrastructure Element 245*ie* as herein used comprises any physical entity associated with the network 100, i.e. a telecommunication network Infrastructure Element 110 of the telecommunication network 110, ICT Infrastructure Elements 115, and any other electronic terminal Infrastructure Element 105 connected to the network 100 such as for example smart phones, tablets, personal computers, drones, robots, etc.

Each G-OS Node 245 is configured to communicate through a proper set of operating system calls with the Operating System of the associated Infrastructure Element 245*ie* (e.g., by means of one or more APIs of the OS). Preferably, each G-OS Node 245 is devised as software application running in the Operating System implemented in the associated Infrastructure Element 245*ie*. Even more preferably, each G-OS Node 245 comprises a Southbound Node interface that is arranged for interacting with underlying Infrastructure Element 245*ie* by using a set of capabilities exported by the Operation System of the Infrastructure Element 245*ie*. For example, such set of capabilities can comprise, but is not limited to, set(s) of functions or routines that accomplish a specific task, that are allowed to interact with a specific software component or abstractions of the underneath hardware of the Infrastructure Element 245*ie* and are preferably accessed by respective APIs.

Each Infrastructure Element 245*ie* can provide and use services (e.g., network services such as the one provided by middle-boxes, VPN, SMS, VM, Virtual storage, etc.) and functions or capabilities (e.g., a robot executing a certain task, a printing of an object by means of a 3D printer, computing power, etc.).

Each G-OS Master 240 is a software module which is responsible for the end-to-end allocation of the tasks of the respective service graph 230*g* to one or more Infrastructure Elements 245*ie* of corresponding G-OS Nodes 245 in the G-OS Layer 215. In more detail, each G-OS Master 240 is associated with one or more G-OS Nodes 245, and the G-OS Master 240 assigns the executions of tasks comprised in the associated service graph 230*g* to such one or more G-OS Nodes 245.

Preferably, although not strictly necessarily, each G-OS Master 240 comprises a Northbound Master Interface specifically arranged for interacting with the Mapping Arbiter 235, e.g. for receiving the service graphs 230*g* from the Mapping Arbiter 235.

In an embodiment of the invention, each G-OS Master 240 and the one or more G-OS Nodes 245 associated therewith are grouped in a corresponding 'Collector' 250 instance generated and dedicated for executing a corresponding service graph 230*g* (as described in more detail in the following).

The Collector 250 further comprises a so-called 'Blackboard' 255, for example a virtual repository, i.e. a software space, shared among the G-OS Master 240 and the one or more G-OS Nodes 245 of the Collector 250.

As discussed in more detail in the following, the Blackboard 255 is used as a medium by the G-OS Master 240 and the one or more G-OS Nodes 245 for exchanging data regarding tasks of the service graph 230*g* to be performed and resources of the one or more G-OS Nodes 245 available for performing said tasks.

Preferably, even thought not strictly necessarily, the one or more G-OS Nodes 245 comprise a Northbound Node interface specifically arranged for interacting with the Blackboard 255 of the Collector 250. Similarly, the G-OS Master comprises a Southbound Master Interface specifically arranged for interacting with the Blackboard 255 of the Collector 250

The Mapping Arbiter 235 is a, preferably fault tolerant, distributed software platform arranged for receiving the service graphs 230*g* generated in the Service Layer 210, selecting proper resources of the network 100, i.e. a proper Infrastructure Element 245*ie* (e.g., an IT server) where to instantiate the G-OS Master 240 arranged for managing a respective service graph 230*g* and providing each respective service graph 230*g* received from the Service Layer 210 to the corresponding G-OS Master 240 just created.

Preferably, although not strictly necessarily, the Mapping Arbiter 235 comprises a Mapping Arbiter Southbound Interface specifically arranged for interacting with the G-OS Master 240, e.g. for allocating service graphs 230g to the G-OS Master 240.

Preferably, upon allocation of a service graph 230g to the G-OS Master 240 by the Mapping Arbiter 235, the latter defines a corresponding Collector 250 for executing such service graph 230g (as described in the following).

Preferably, although not strictly necessarily, the G-OS layer 215 further comprises a G-OS Data Base—G-OS DB—260. The G-OS Data Base 260 is a data base that collects a list of types of tasks that may be performed by entities of the network 100, a list and descriptions of the Infrastructure Elements 245ie of the network 100, advantageously indicating which tasks each Infrastructure Elements 245ie is able to accomplish.

In addition, the descriptions of the Infrastructure Elements 245ie of the network 100 comprised in the G-OS Data Base 260 advantageously contains the main features of each Infrastructure Elements 245ie (e.g., a network function implemented by a network node, hardware and/or software comprised in the Infrastructure Elements 245ie such as for example sensors and/or actuators models and performance parameters, power source type and total/current autonomy time, etc,), and also an information related to its geographical location.

Figure 3A:
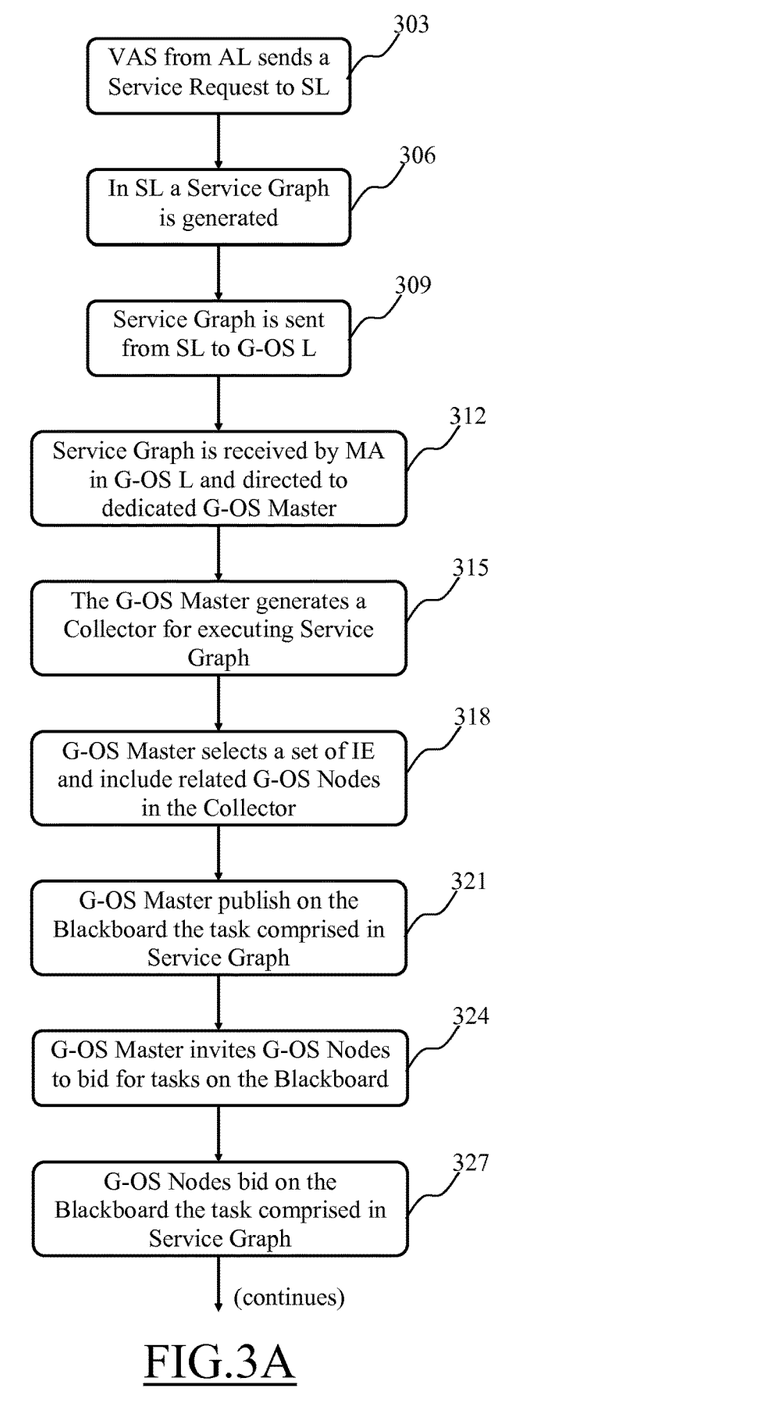
FIGS. 3A-3B are a schematic flowchart of a method for the end-to-end services provisioning in the network according to an embodiment of the present invention.
Figure 3B:
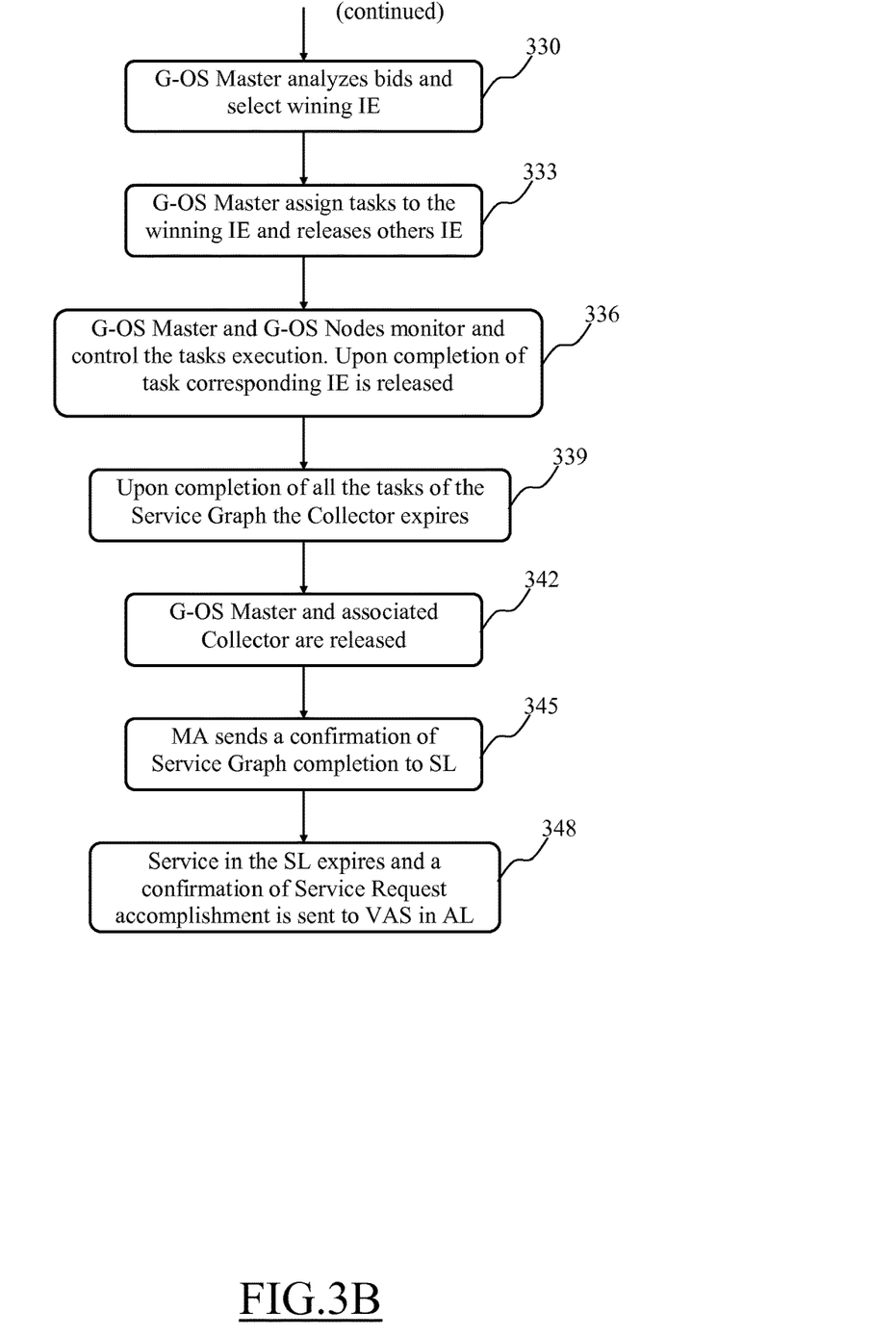

Having described the layered structure 200 of the network 100 according to an embodiment of the present invention, it is now described a method of managing Infrastructure Elements 245ie of the network 100 in order to perform service requests 220r generated by VAS 220 according to an embodiment of the present invention, by making reference to FIGS. 3A-3B which are a schematic flowchart thereof.

The operation is initiated (block 303) by a generic VAS 220 in the Application Layer 205 that generates at least one corresponding service request 220r and routes such service request 220r to the Service Layer 210.

The Service Layer 210 receives the service request 220r and generates a corresponding service 230 from which a related service graph 230g is obtained (block 306; i.e., the service request 220r is translated in a corresponding service graph 230g).

According to an embodiment of the present invention, the service graph 230g just generated is sent (block 309) to the Mapping Arbiter 235 instantiated in the G-OS layer 215.

The Mapping Arbiter 235 analyzes the service graph 230g and, possibly, on the basis of information stored in the G-OS Data Base 260 selects suitable resource of the network 100 (e.g., a suitable Infrastructure Element 245ie such as for example an IT server) on which the Mapping Arbiter 235 instantiate a dedicated G-OS Master 240 and directs the service graph 230g thereto (block 312). In other words, the Mapping Arbiter 235 selects a suitable resource of the network 100 capable of supporting the G-OS Master 240 arranged for managing the accomplishment of the tasks comprised in the service graph 230g.

The G-OS Master 240 creates (block 315) a Collector 250 instance for executing the tasks contained in the received service graph 230g. At this stage, the Collector 250 comprises an instance of a G-OS master 240 and an instance of a Blackboard 255.

In the following the execution of the tasks comprised in the service graph 230g is managed by instances contained in the Collector 250 and generated for these purposes.

The G-OS master 240, by using the information stored in the G-OS Data Base 260, determines a set of one or more Infrastructure Elements 245ie, and related G-OS Nodes 245, of a pool of available Infrastructure Elements 245ie of the network 100, which are potentially able to execute one or more tasks comprised in the service graph 230g. For example, the Infrastructure Elements 245ie are selected on the basis of a capability of providing a task comprised in the service graph 230g.

The G-OS Nodes 245 associated with the Infrastructure Elements 245ie identified in this manner are included in the Collector 250 (block 318).

The G-OS Master 240 'publishes' in the Blackboard 255 all the tasks comprised in the service graph 230g (block 321). For example, the publishing action is performed through a "pub" method that is a general programmed procedure instantiated in the Blackboard 255 after being associated with all the tasks comprised in the service graph 230g. In other words, the G-OS Master 240 provides in the shared (among G-OS Master 240 and G-OS Nodes 245) repository, i.e. the Blackboard 255, a description of the tasks of the service graph 230g and indicates resource requirements and/or performance request (e.g., by means of KPI) for the execution of each one of such tasks.

In an embodiment of the invention, tasks published in the Blackboard 255 are represented in terms of tuples (i.e. ordered multiple set of attributes). Preferably, each tuple contains a task type and related performance request(s), e.g. by means of one or more KPI. For example, the KPI include cost, execution time and quality requirements specific of the task (e.g., network latency, software application latency, actuators/sensors performance, QoS, QoE, etc.).

Then (block 324), G-OS Master 240 'invites' the G-OS Nodes 245 comprised in the Collector 250 (after the step at block 318) to 'bid' for the tasks published in the Blackboard 255. For example, the inviting action is performed through an "invite" method that is a general programmed procedure instantiated in the Blackboard 255 after being associated with G-OS Nodes 245 comprised in the Collector 250.

In response to the invitation, the G-OS Nodes 245 associated with Infrastructure Elements 245ie that have available resources publish a 'bid' in the Blackboard 255. For example, the bidding action is performed through a "bid" method that is a general programmed procedure instantiated in the Blackboard 255 after being associated with G-OS Nodes 245 comprised in the Collector 250.

Each bid indicates which task of the published tasks addresses and the (available) resources that the Infrastructure Elements 245ie, associated with the G-OS Nodes 245 that made the bid, is able to offer for executing such task (block 327). For example, the resources that the Infrastructure Elements 245ie, is able to offer is indicated in the bid as a value of the KPI that the Infrastructure Elements 245ie is able to guarantee in executing the considered task.

In an embodiment of the invention, the G-OS Nodes 245 are configured to evaluate the tasks published by the G-OS Master 240 on the Blackboard 255 by matching the corresponding tuples with the capabilities of the associated Infrastructure Element 245ie, particularly by taking into account the requested KPI comprised in such tuples.

Alternatively, the G-OS Nodes 245 could make a single bid for a group of, or for all, the tasks published.

The G-OS Master 240 analyses (block 330) all the bids made by the G-OS Nodes 245 and, for each one of the tasks, the G-OS Master 240 selects a corresponding 'winning' Infrastructure Element 245ie. In other words, for each task the G-OS Master 240 selects the Infrastructure Elements 245ie associated with the G-OS Nodes 245 able to ensure an optimized provisioning of a task.

In an embodiment of the present invention, the G-OS Master 240 implements Selection System and Methods (SSM), which is a capability of the G-OS Master 240 designed to select the winning Infrastructure Elements 245ie to which the execution of the tasks of the service graph 230g is assigned. In order to perform such a selection, the Selection System and Methods applies methods and algorithms (e.g., based on linear programming, heuristics, etc.) that allow selecting as the 'winning' Infrastructure Element 245ie the Infrastructure Element 245ie that 'declared' the best KPI value(s) with respect to the KPI value(s) associated with a task comprised in the service graph 230g.

For example, by considering a KPI referred to a latency of the network 100 in completing a corresponding task, the Selection System and Methods may select a winner Infrastructure Element 245ie among the terminal Infrastructure Elements 105, the telecommunication Infrastructure Elements 110 and/or the ICT Infrastructure Elements 115 according to a complexity (e.g. a computational complexity) of the task to be performed and an end-to-end latency (e.g., expressed in milliseconds) of the network 100.

Figure 4:
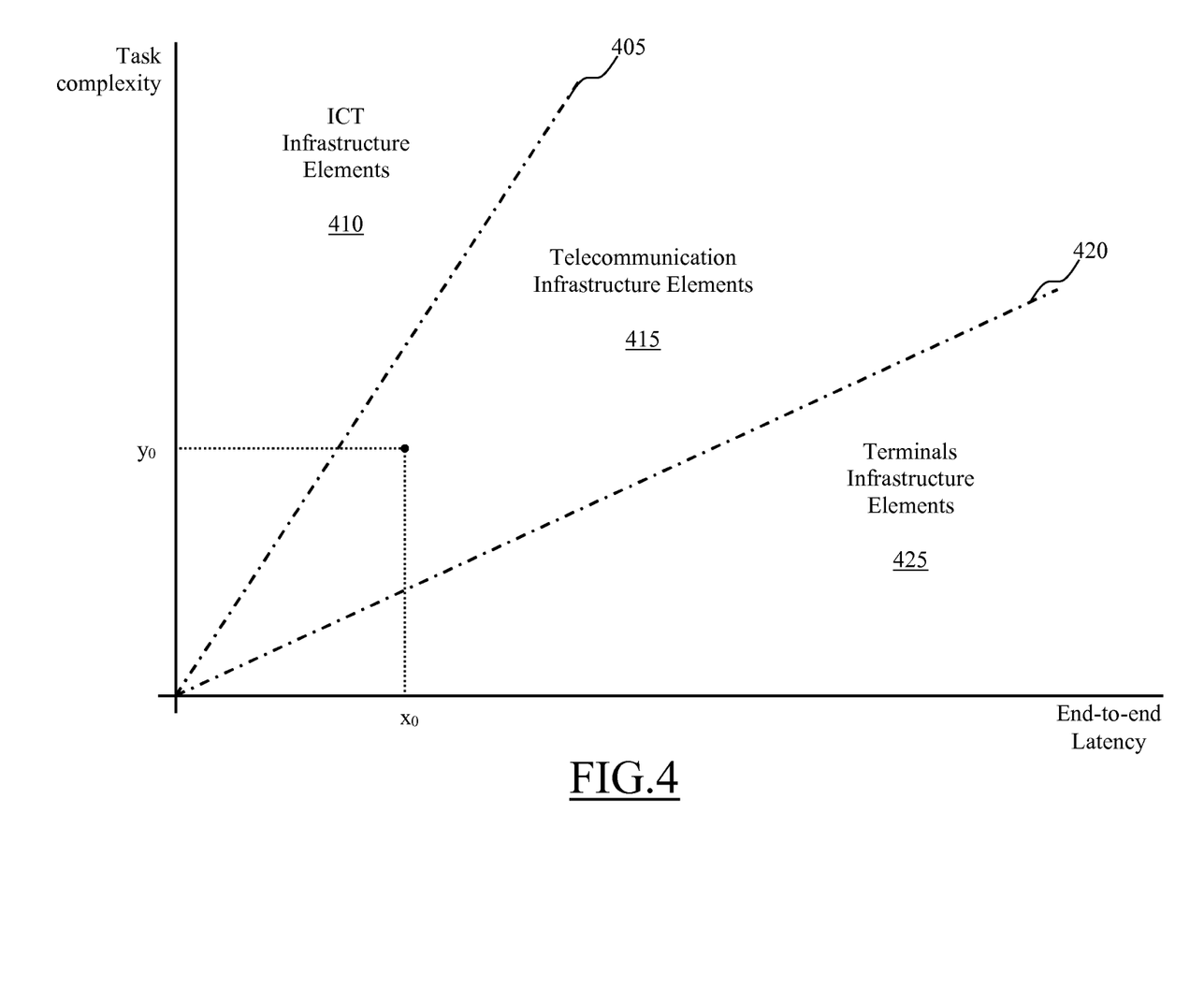
FIG. 4 is a schematic exemplary diagram illustrating a resource selection of an Infrastructure Element of the network for accomplishing a predetermined task.

As shown in the qualitative diagram of FIG. 4, the higher is the complexity of the task to be performed, the higher is the probability that the task is assigned to an Infrastructure Element 245ie belonging to the ICT Infrastructure Elements 115 which are able to perform the task faster (generally having the largest computing power) than the other types of Infrastructure Elements 110 and 105 of the network 100, thus lowering the global end-to-end latency. It should be noted that an angular coefficient of both a first boundary line 405 (represented by a dash-dotted line in FIG. 4) separating an ICT Infrastructure Elements region 410 from a telecommunication Infrastructure Elements region 415, and a second boundary line 420 (represented by a dash-dotted line in FIG. 4) separating the telecommunication Infrastructure Elements region 415 from a Infrastructure Elements region 425 are dependent on telecommunication network 112 (data) throughput. Particularly, the angular coefficient of the first boundary line 405 depends on the throughput between the telecommunication network 112 and the ICT Infrastructure Elements 115 while the angular coefficient the second boundary line 420 depends on the throughput between the telecommunication network 112 and the Infrastructure Elements 115.

The G-OS Master 240 assigns the tasks to the corresponding winner Infrastructure Elements 245ie. In other words, each winner Infrastructure Elements 245ie 'takes' in charge the execution of the corresponding task. For example, the taking action is performed through a "take" method that is a general programmed procedure instantiated in the Blackboard 255 after being associated with G-OS Nodes 245 of winning Infrastructure Elements 245ie.

At the same time, the remaining Infrastructure Elements 245ie associated with the G-OS Nodes 245 comprised in the Collector 250 are released. In other words, all the Infrastructure Elements 245ie that have not been assigned with a task by the G-OS Master 240 are made available for being selected by other Collectors 250 instantiated in the G-OS layer 215 for processing different service graphs 230g (i.e., unassigned Infrastructure Elements 245ie are returned to the pool of available Infrastructure Elements 245ie of the network 100) (block 333).

Afterwards, the G-OS Master 240 and the corresponding G-OS Nodes 245 monitor and control the execution of the tasks being performed by the corresponding (winner) Infrastructure Elements 245ie.

In an embodiment of the invention, the G-OS Master 240 manages exceptions and errors that could happen during the tasks execution, and supports roll-back capabilities in order to guarantee the consistency of the Collector 250 in case of any failure.

For example, if an Infrastructure Element 245ie fails during the execution of a task, the G-OS Master 240 receives a notification from the G-OS node 245 associated with such Infrastructure Element 245ie and manages the exception by assigning the task to another Infrastructure Element 245ie—preferably, although not strictly necessarily, one of the Infrastructure Elements 245ie associated with the G-OS Nodes 245 previously comprised in the Collector 250.

In case the G-OS Master 240 is not able to find an available Infrastructure Element 245ie (e.g., all the Infrastructure Elements 245ie that can execute the task are already allocated to other Collectors), the G-OS Master 240 may communicate a help request to other G-OS Masters 240 through a East/West Master interface provided for allowing G-OS Masters 240 of different Collectors 250 exchanging information. If another G-OS Master 240 is able to help the requesting one, such another G-OS Master 240 sends a confirmation and task is moved from the Blackboard 255 of the Collector 250 'in trouble' to the Blackboard 250 of the helping Collector 250. In this case, when the execution of the moved task is completed (e.g., by one of the Infrastructure Element 245ie of the helping Collector 250) the G-OS Master 240 of the helping Collector 250 sends a notification of the task completion to the G-OS Master 240 that requested help.

Preferably, the G-OS Master 240 is also configured for supporting security capabilities that ensure a safe environment and preserve it from any cyber-attacks.

When a task is completed, the G-OS Nodes 245 associate with the corresponding Infrastructure Element 245ie notifies the G-OS Master 240 that the task has been accomplished. Therefore, the task is deleted from the Blackboard 255 and the G-OS Node 245 and the associated corresponding Infrastructure Elements 245ie are released (i.e., the Infrastructure Element 245ie is returned to the pool of available Infrastructure Elements 245ie of the network 100) (block 336).

When all the tasks comprised in the service graph 230g are completed (i.e., the Blackboard 255 is empty) the G-OS Master 240 notifies the accomplishment of all the tasks of the service graph 230g to the Mapping Arbiter 235 and the Collector 250 expires (block 339), i.e. the Collector 250 is terminated and the computing/hardware resources associated thereto are to be released.

Then, the G-OS Master 240 instance is terminated and the hosting Infrastructure Element 245ie (i.e., the resource of the network 100 where the G-OS Master 240 has been instantiated) is released. In other words, the hosting Infrastructure Element 245ie is again available for being selected by the Mapping Arbiter 235 for hosting a new G-OS Master 245 or for being selected as a G-OS Node 245.

At this point, the Mapping Arbiter 235 notifies the accomplishment of the tasks in the service graph associated with the Service 230 to the Service Layer 210 (block 345).

Finally the method ends with the Service 230 in the Service Layer 210 that is marked as completed (possibly removed) and the notification of the accomplishment of the service request 220r to the VAS 220 in the Application Layer 205 that requested the Service 230 and then the Service 230 expires (block 348), i.e. the Service 230 is removed from the Service Layer 210.

It should be noted that the method described above may undergo several modification, e.g. similar steps with the same functions may substitute several steps or portions thereof, some non-essential steps may be removed, or additional optional steps may be added, the steps may be performed in different order, in parallel or overlapped (at least in part), without departing from the scope of the present invention.

In summary, the actuation of the service request 220r is the result of all the actions operated by the Infrastructure Elements 245ie selected by the G-OS Master 240 in the related Collector 250.

The G-OS Master 240 substantially creates a chain (or path) of resources (i.e., Infrastructure Elements) of the network 100 in order to accomplish the tasks specified in the service graph 230g which is a translation made at the service layer of a corresponding service request 220r.

By making reference to FIG. 5, which is a schematic representation of a service graph 230g and of an infrastructure graph 505 associated with the former, a chain of resources of the network 100 is generally described in the following.

The generic Infrastructure Element 245ie, in addition to what described above (particularly with respect to FIG. 2) may also be schematized as an entity comprising two main elements, namely an Infrastructure Processing Element (IPE) 510 and an Infrastructure Forwarding Element (IFE) 515.

The IPE 510 is a portion (e.g., a CPU) of the Infrastructure Element 245ie demanded to elaboration and processing of data.

The IFE 515 is a portion (e.g., a modem element) of the Infrastructure Element 245ie demanded to transmit and receive information throughout the network 100.

In addition, the generic Infrastructure Element 245ie may also comprise one or more actuators 520 (e.g., motors, robotic limbs, etc.) for, e.g., interacting with a surrounding environment and/or one or more sensors 525 (e.g., temperature, humidity, pressure, proximity sensors, photo/videocameras, audio acquisition arrangements, etc.) for, e.g., acquiring data regarding the surrounding environment.

It should be noted that also an Infrastructure Element 245ie comprising only one or more actuators 520 and/or one or more sensors 525 and the IFE 515 (i.e., without an IPE 510) may be managed by the method according to an embodiment of the present invention.

Figure 5:
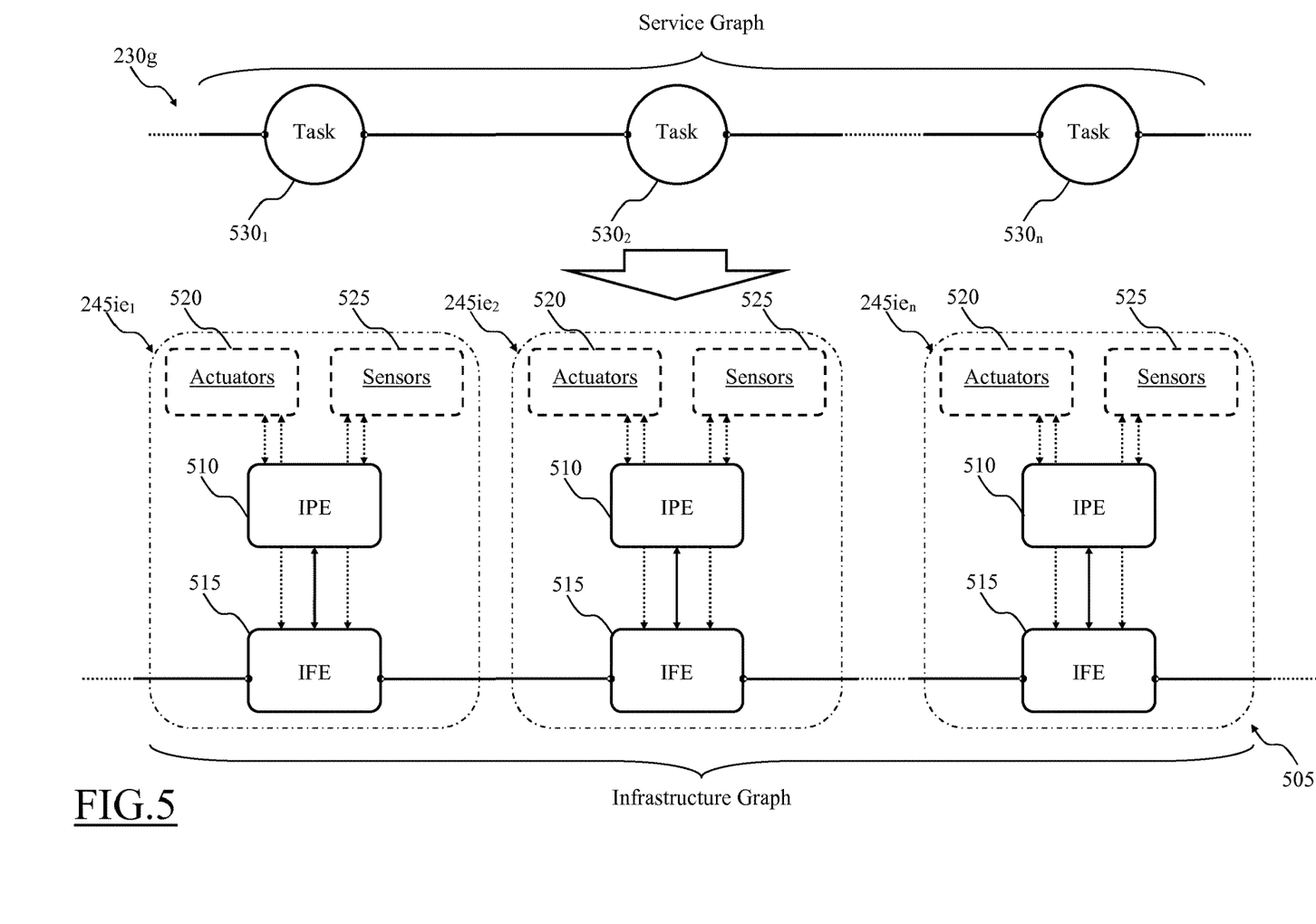
FIG. 5 is a schematic representation of a service graph and of a corresponding infrastructure graph obtained from the method according to an embodiment of the invention.

The IPE 510, the IFE 515 and the actuators 520 and/or sensor 525 (if provided) are advantageously interconnected one with the others (possibly with the actuators 520 and/or sensor 525 interconnected with the IFE 515 through the IPE 510 or directly as shown in FIG. 5 by dashed arrows) in order to transfer signals (e.g., data regarding task to accomplish and results or acknowledgement of task accomplishment).

Preferably, tasks $530_{1+n}$ (where $2 \leq n \leq N$; N integer) of the service graph 230g are ordered in such a way that possible results of a task (e.g., task $530_1$) may be inputted to a subsequent task (e.g., task $530_2$). Similarly, Infrastructure Elements 245ie selected by the G-OS Master 240 for accomplishing a task $530_{1+n}$ of the service graph 230g are advantageously logically connected to other Infrastructure Elements 245ie selected by the G-OS Master 240 for accomplishing a next task $530_{2+n+1}$ of the service graph 230g which requires one or more of the outputs obtained from the accomplishment of the preceding task $530_{1+n}$ in order to perform the respective task $530_{2+n+1}$—e.g., a Virtual Machine implemented in a first Infrastructure Elements 245ie requiring measurements obtained by one or more sensing devices corresponding to one or more Infrastructure Elements 245ie.

The G-OS Masters 240 selects and organizes the Infrastructure Elements 245ie in order to allow the network 100 performing corresponding service requests 220r generated by VAS 220 in an optimized manner with respect to specific requirements (expressed by means of KPI).

In conclusion, the G-OS 120 allows the provisioning of services of the most disparate types of Infrastructure Elements (terminal Infrastructure Elements 105, telecommunication Infrastructure Elements 110 and ICT Infrastructure Elements 115) interconnected among each other to form a complex network 100. The G-OS 120 is arranged to select resources available in the network 100 in order to configure a branch of the network 100 for a distributed provisioning of end-to-end services; for example, service(s) requested by a program application operating on a first Infrastructure Element 105, 110 and/or 115 (i.e., Infrastructure Elements 245ie) of the network 100 are managed by the G-OS 120 by selecting, logically interconnecting (e.g., by defining one or more dedicated data channels or data paths in the network 100) and configuring one or more Infrastructure Elements 105, 110 and/or 115 (i.e., Infrastructure Elements 245ie) best suited for providing the service 230 requested in an optimized manner according to performance requirements (e.g., predetermined minimum values for the KPI) expressed in the service request 220r.

The invention claimed is:

1. A method of providing a service to a requesting Infrastructure Element belonging to plurality of Infrastructure Elements interconnected to form a data network managed by a distributed operating system that is distributed among the plurality of Infrastructure Elements, the method comprising:

a) receiving a service request requesting the provisioning of the service from the requesting Infrastructure Element, the service request comprising an indication of one or more performance requirements;

b) converting said service request into a service graph to identify at least one task to be accomplished in compliance with said one or more performance requirements in order to provide said service, the at least one task being represented as a tuple including a set of attributes of the at least one task, the service graph including a sequence of instructions to be executed by the distributed operating system;

c) selecting at least one first Infrastructure Element currently capable of accomplishing said at least one task in compliance with said one or more performance requirements, the at least one first Infrastructure Element being selected based on a bidding process in which Infrastructure Elements provide a bid identifying the at least one task and resources of the Infrastructure Elements for performing the at least one task, the at least one first Infrastructure Element being selected based on a comparison of a bid thereof and bids of the Infrastructure Elements other than the at least one first Infrastructure Element;

d) configuring the selected at least one first Infrastructure Element to accomplish said at least one task;

e) causing the selected at least one first Infrastructure Element to accomplish said at least one task to provide the service to the requesting Infrastructure Element;

f) monitoring, by a Master Element, the selected at least one first Infrastructure Element while performing said at least one task; and g) selecting, by the Master Element, another Infrastructure Element from the plurality of Infrastructure Elements to perform said at least one task in a case that the selected at least one first Infrastructure Element fails during performance of said at least one task, the Master Element transmitting a request to other Master Elements for identification of an Infrastructure Element associated with at least one of the other Master Elements that is capable of completing said at least one task in a case that the Master Element is unable to identify another Infrastructure Element from the plurality of infrastructure elements to perform said at least one task, wherein the at least one first Infrastructure Element is selected based, at least in part, on an interdependency among tasks, including the at least one task, so that an output of the at least one first Infrastructure Element after completion of the at least one task, that is required by at least one other task, is available at a time of performance of the at least one other task, and wherein the service includes at least one of Virtual Private Networks (VPN) and Short Messaging Service (SMS), and the Infrastructure Element includes at least one of autonomous cars, robots, three-dimensional (3D) printing systems, automated factory machineries, and drones.

2. The method according to claim 1, wherein at least one instantiated software application is instantiated in said requesting Infrastructure Element, and wherein the step a) of receiving the service request requesting the provisioning of the service from the requesting Infrastructure Element comprises:

receiving the service request from at least one software application instantiated on said requesting Infrastructure Element, and wherein the step e) of causing the selected at least one first Infrastructure Element to accomplish said at least one task to provide the service to the requesting Infrastructure Element comprises:

causing the selected at least one first Infrastructure Element to accomplish said at least one task to provide the service to said at least one software application instantiated on said requesting Infrastructure Element.

3. The method according to claim 1, wherein said indication of one or more performance requirements comprises one or more minimum performance values, and wherein the step of c) selecting at least one Infrastructure Element of the set of infrastructure elements currently capable of accomplishing the at least one task in compliance with said one or more performance requirements comprises:

identifying a set of one or more of the Infrastructure Elements capable of providing said at least one task, and selecting the at least one first Infrastructure Element of the set of Infrastructure Elements currently capable of accomplishing the at least one task with a highest performance value with respect to said one or more minimum performance values.

4. The method according to claim 1, wherein the Infrastructure Elements further includes at least one of comprise at least one among smartphones, tablets, personal computers, data centers, virtualization servers, cloud computing networks, information technology (IT) servers for implementing thereof, radio base stations, middleboxes, switches, routers, and network nodes comprising operating system interconnection (OSI) layer 2-7 network functionalities.

5. The method according to claim 1, wherein the service comprises at least one among Virtual Machines (VM), Virtual Storage, Platform as a Service (PaaS) Infrastructure as a Service (IaaS), Software as a service (SaaS), manufacturing a three-dimensional (3D) printed element, collection of measurements, computing power, data storage and robot actions.

6. The method according to claim 1, further comprising:
h) selecting and configuring an Infrastructure Element belonging to the plurality of Infrastructure Elements for managing the execution of steps c)-e).

7. The method according to claim 6, wherein the step h) of selecting and configuring an Infrastructure Element belonging to the plurality of Infrastructure Elements for managing the steps c)-e) comprises:

providing the Master Element which is configured to manage the execution of steps c)-e).

8. The method according to claim 7, wherein the computing system comprises a database comprising a list of the plurality of Infrastructure Elements of the network providing an indication of which tasks each Infrastructure Element is capable of accomplishing, and wherein identifying a set of one or more of the Infrastructure Elements capable of providing said at least one task comprises:

having a master software module of the Master Element identify the set of one or more of the Infrastructure Elements capable of providing said at least one task on the basis of said indication comprised in the data base.

9. The method according to claim 6, further comprising:
i) providing a node software module in each Infrastructure Element belonging to the plurality of Infrastructure Elements configured to interact with master software module of the Master Element.

10. The method according to claim 9, further comprising:
j) providing a shared software space shared among the master software module and the node software modules of the set of one or more of the Infrastructure Elements capable of providing said at least one task, said shared software space being configured to store and exchange information among the master software module and the node software modules capable of providing said at least one task.

11. The method according to claim 10, wherein the bidding process for selecting the at least one Infrastructure Element of the set of Infrastructure Elements currently capable of accomplishing the at least one task with a higher performance value with respect to said one or more performance values comprises:

having the master software module store in the shared software space the one or more performance values required for the accomplishment of the at least one task;

having each one of the node software modules store in the shared software space one or more currently ensured performance values for the accomplishment of the at least one task by the corresponding Infrastructure Elements, having the master software module analyze the one or more currently ensured performance values for the accomplishment of the at least one task provided by the node software modules;

having the master software module assign the at least one task to the at least one first Infrastructure Element of the set of Infrastructure Elements currently capable of accomplishing the at least one task with a highest performance value.

12. A computing system for providing a service to a requesting Infrastructure Element belonging to plurality of Infrastructure Elements interconnected to form a data network managed by a distributed operating system that is distributed among the plurality of Infrastructure Elements, the computing system comprising:

circuitry configured to:
receive a service request requesting the provisioning of the service from the requesting Infrastructure Element, the service request comprising an indication of one or more performance requirements and
convert said service request into a service graph to identify at least one task to be accomplished in compliance with said one or more performance requirements in order to provide said service, the at least one task being represented as a tuple including a set of attributes of the at least one task, the service graph including a sequence of instructions to be executed by the distributed operating system;

a software module configured to:
select at least one first Infrastructure Element currently capable of accomplishing said at least one task in compliance with said one or more performance requirements, the at least one first Infrastructure Element being selected based on a bidding process in which Infrastructure Elements provide a bid identifying the at least one task and resources of the Infrastructure Elements for performing the at least one task, the at least one first Infrastructure Element being selected based on a comparison of a bid thereof and bids of the Infrastructure Elements other than the at least one first Infrastructure Element,
configure the selected at least one first Infrastructure Element to accomplish said at least one task,
cause the selected at least one first Infrastructure Element to accomplish said at least one task to provide the service to the requesting Infrastructure Element,
monitor the selected at least one first Infrastructure Element while performing said at least one task, and
select another Infrastructure Element from the plurality of Infrastructure Elements to perform said at least one task in a case that the selected at least one first Infrastructure Element fails during performance of said at least one task, the circuitry transmitting a request to Master Elements in the data network for identification of an Infrastructure Element associated with at least one of the Master Elements that is capable of completing said at least one task in a case that the circuitry is unable to identify another Infrastructure Element from the plurality of infrastructure elements to perform said at least one task, wherein the at least one first Infrastructure Element is selected based, at least in part, on an interdependency among tasks, including the at least one task, so that an output of the at least one first Infrastructure Element after completion of the at least one task, that is required by at least one other task, is available at a time of performance of the at least one other task, and wherein the service includes at least one of Virtual Private Networks (VPN) and Short Messaging Service (SMS), and the Infrastructure Element includes at least one of autonomous cars, robots, three-dimensional (3D) printing systems, automated factory machineries, and drones.

* * * * *